Jan. 8, 1957  J. E. MacGRIFF ET AL  2,777,030
FLUID LEVEL INDICATOR
Filed June 8, 1953
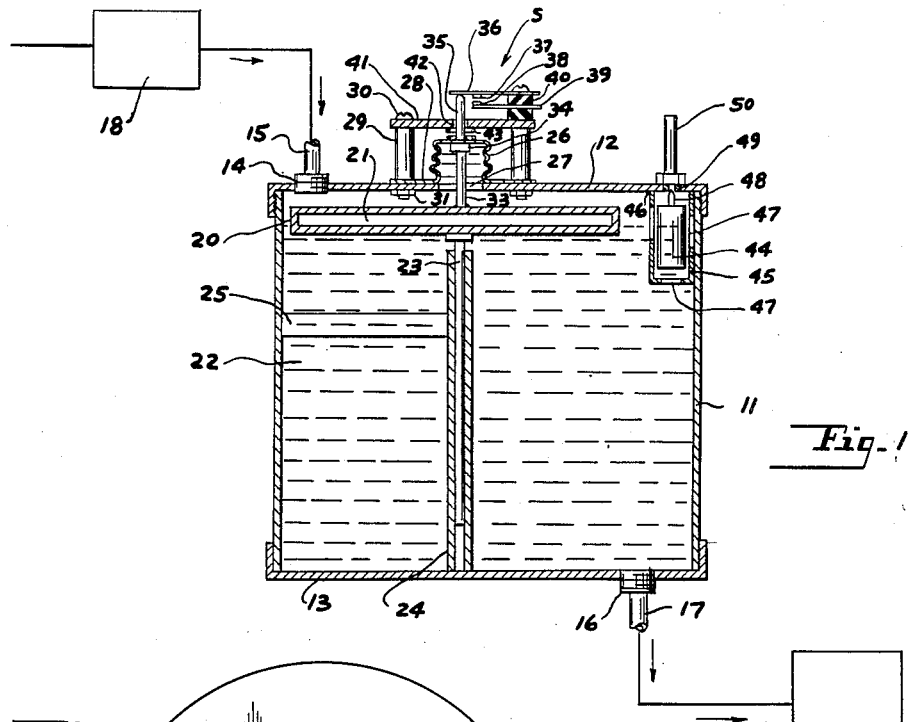
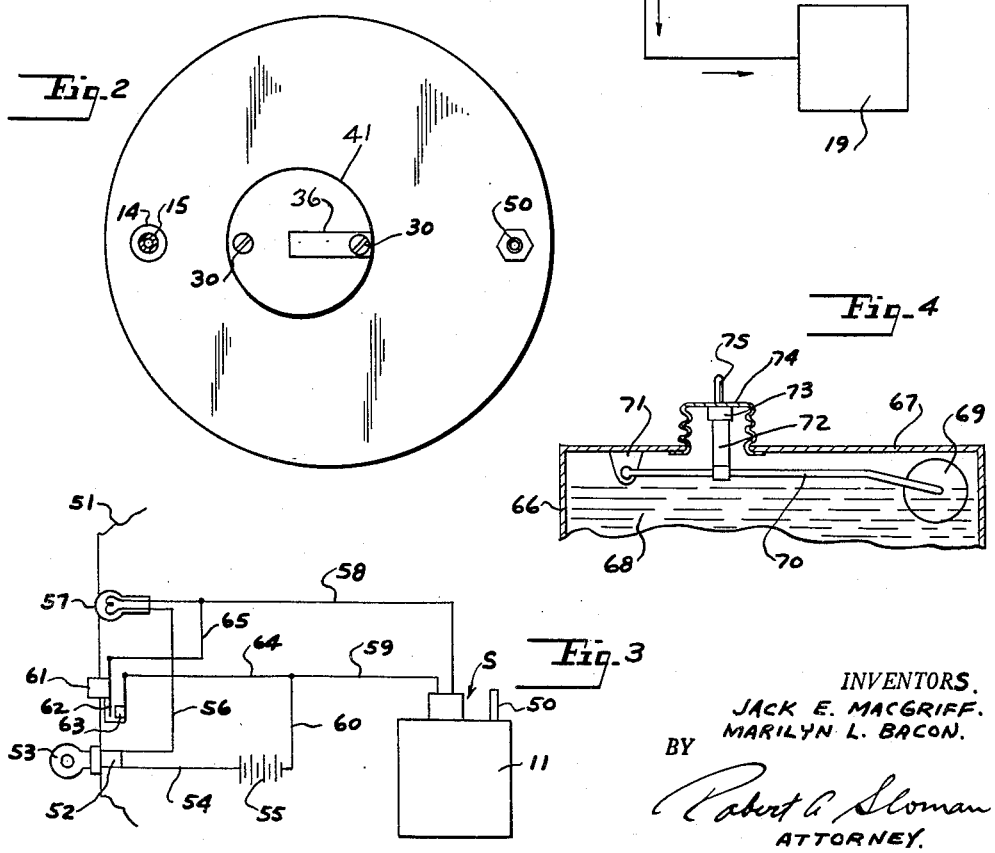
INVENTORS.
JACK E. MACGRIFF.
MARILYN L. BACON.
BY
Robert C. Sloman
ATTORNEY.

United States Patent Office 2,777,030
Patented Jan. 8, 1957

2,777,030
FLUID LEVEL INDICATOR

Jack E. MacGriff and Marilyn L. Bacon, Detroit, Mich.

Application June 8, 1953, Serial No. 360,092

1 Claim. (Cl. 200—84)

This invention relates to a liquid level indicator and more particularly to an indicating device having an electrical switch associated therewith.

It is the object of the present invention to provide a liquid level indicator which would be suitable for use in conjunction with inflammable and explosive liquids with the electrical unit isolated from such liquids.

It is the further object of the present invention to provide a liquid level indicator including a fluid container and with a float therein, which is substantially coextensive with the width of said container for accurately indicating when the fluid falls below a pre-determined level.

It is the further object of the present invention to provide a liquid level indicator, which could be adapted for use in conjunction with a vehicle fuel pump and carburetor, whereby a visual indication or other alarm could be given when only a limited quantity of fuel remains, so that a motorist would know that by the visual or audible indication that he has a certain measured amount of fuel left.

Heretofore, the conventional gasoline gauge in the regular fuel tank is so small with respect to the tank that when the gauge shows empty it will not accurately indicate what fuel is left because the same is distributed over the entire bottom of the tank.

It is, therefore a still further object of the present invention to provide a fuel level indicator which will register on a very minute change in the fuel supply within an auxiliary container in the gasoline line between the vehicle fuel pump and carburetor, for illustration.

These and other objects will be seen from the following specification and claim, in conjunction with the appended drawing, in which:

Fig. 1 is an elevational section of the present liquid level indicator and with a fuel pump and carburetor diagrammatically indicated.

Fig. 2 is a plan view thereof.

Fig. 3 is a diagrammatic view of the electrical circuit employed; and

Fig. 4 is a fragmentary elevational section similar to Fig. 1, illustrating a different mounting for the float.

It will be understood that the above drawing illustrates merely a preferred embodiment of the invention, and that other embodiments are contemplated within the scope of the claim hereafter set forth.

The present liquid level indicator includes an upright container 11, preferably cylindrical, and including top and bottom members 12 and 13, together with fluid inlet fitting 14 in said top and with fluid outlet fitting 16 in said bottom for illustration.

Inlet conduit 15, which may be connected to fuel pump 18 joins inlet fitting 14. Conduit 17 which may be connected with a vehicle carburetor 19, for illustration, connects outlet fitting 16.

The float 20, which may be solid, constructed of wood or cork, is in the present embodiment hollow, as shown in the drawing at 21, and is substantially coextensive with the width of container 11. Said float is positioned upon the top surface of the fluid 22, the level of which is sought to be indicated in the manner hereafter described.

Guide rod 23 depends from the undersurface of float 20 and is slidably positioned within the upright tube 24, which is secured in upright position by the bracket 25.

The collapsible or flexible bellows 26, preferably constructed of copper, for illustration, has its interior in communication with the interior of container 11, through the aperture 27 in its top. The bottom peripheral portion 28 of said bellows is suitably sealed against the top of cover 12 and is held down by the upright supports 29, which mount at their upper end the guide plate 41, employing the bolts 30 and the nuts 31.

Upright rod 33 is centrally secured to the top of float 20 and projects into the bellows 26 and carries a head 34 at its upper end adapted for operative engagement with the top surface of said bellows.

The upright operator rod 35 is suitably secured upon the top of said bellows, extends through the opening 42 in plate 41, and the upper end of said rod engages the leaf support 36 which mounts the movable contact 37 of the switch S. As shown in Fig. 1 a second contact 38 is shown spaced from contact 37 and upon the outer end of the switch leaf 39. The contact supporting elements 36 and 39 with suitable insulators 40 are mounted upon the plate 41 and secured in position by the bolt 30 and its respective nut 31.

Coiled spring 43 loosely encloses rod 35 and is interposed between plate 41 and bellows 26, normally urging the same downwardly against the action of rod 33.

A second upright float 44 is slidably positioned within the cylindrical guide 45, which is suitably secured to the undersurface of container top 12, as at 46, and which has a plurality of apertures 47 for communication with the fluid 22.

Upright needle valve 48 is mounted upon float 44 and is adapted for cooperating engagement with the valve seat 49, which is centrally apertured and in communication with the air vent 50 upon said container.

With the fluid 22 at a pre-determined level within said container, the air vent 50 will be closed by the valve 48 and the pressure within the interior of said container will build up to a point so that no additional fluid will flow into said container through conduit 15.

In the event that the present indicator is employed upon a vehicle as between the fuel pump 18 and carburetor 19, it is apparent that when the storage tank is empty, pump 18 will stop delivering fluid and the carburetor will begin to use the fluid 22 within the container 11. If the fluid level descends needle valve 48 on float 44 will be unseated permitting the introduction of air through vent 50 to facilitate the drainage of fluid from container 11 into the carburetor 19, diagrammatically shown.

As the float 20 descends with the fluid level, the rod 33 will correspondingly move downward permitting the bellows 26 under the action of spring 43 to partially collapse downwardly. This in turn permits a downward movement of switch operator 35 and contact 37 into engagement with contact 38 for closing an electric circuit, hereafter described with a visible or audible signal.

Referring to Fig. 3, a vehicle dashboard is generally indicated at 51, having suitably mounted therein the visible signal or bulb 57 and including the switch 52 controlled by the key 53.

Said switch is connected to battery 55 by lead wire 54.

The second lead 56 from switch 52 is connected in series with bulb 57 and a return lead 58 connects said bulb with the stationary contact 38, for illustration.

From Fig. 1, contact 37 engages contact 38 upon dropping of the fluid level in container 11, thereby completing the electrical circuit through the leads 59 and 60 back to the battery.

Thus, the bulb 57 on the vehicle dashboard will be energized and will indicate to the driver that there is a very limited supply of gasoline left, which may be enough to carry the vehicle a mile or so, for example.

A test circuit is provided adjacent dashboard 51 whereby the operator may ascertain in advance whether the bulb 57 is in operating condition.

The test circuit includes the pushbutton 61 joined to the switch arm 62, which when depressed engages stationary contact 63 connected to lead wire 64, and lead 60 to the battery 55, and thence through lead 54, through key operated switch 52 and lead 56 to the bulb 57. The circuit is completed through the second lead 65 from the bulb back to the pushbutton operated contact 62.

Fig. 4 fragmentarily illustrates a slight variation wherein the container 66 with cover 67 and containing fluid 68 has therein the float 69. Said float is mounted on one end of the arm 70, which is pivotally supported at its opposite end from the bracket 71.

The upright rod 72 connected to arm 70 has an enlargement 73 adapted to operatively engage the top surface of the bellows 74, which carries the switch operator rod 75, which functions in the same manner as operator rod 35 in connection with Fig. 1.

It is contemplated that the present indicator will give a positive electric indication when the fluid level in the container descends below a pre-determined point. Thus, the present device will register on a very minute change in fluid level in said container. Because the metal bellows isolates the switch from the gasoline, for example, there is no danger of an explosion.

The advantage of applicant's large type of float is that it will supply the necessary pressure to operate the metal bellows and switch with a very small change in liquid level. Guide tube 24 and rod 23 prevent side motion from affecting the indication of rod 35. It has been found convenient in some situations to employ the coiled spring 43. However, it is contemplated that the bellows may have such inherent resiliency that such spring may not be needed. While one type of switch has been shown generally at S, it is contemplated that other types of switches could be employed, such as snap action switches or microswitches.

While tube 24 is one type of guide means for rod 23, other types of guides could be employed which cooperatively receive rod 23.

Having described our invention, reference should now be had to the claim which follows for determining the scope thereof.

We claim:

A fuel level indicator for a vehicle comprising an upright normally filled container of predetermined volume having an inlet adapted for connection to a source of fuel and an outlet, a vertically movable float in said container responsive to the fuel level therein, a bellows mounted upon and with its interior in communication with the interior of said container, an upright rod on said float projected up into said bellows and operatively engageable with its top surface, a normally open switch mounted on said container above said bellows including a pair of spaced closable contacts, an upright operator rod on said bellows normally engageable with one of said contacts at a predetermined fuel level in said container for maintaining said contacts in spaced relation, said float responding to any appreciable fall in said predetermined fuel level on failure of said source permitting closing of said contacts, said inlet serving as a container vent only while said source lasts, a normally closed air vent tube upon said container adapted for opening only on failure of said source, a second float in said container, guide means on said container for said second float, and a needle valve actuated by the second float for closing said vent at said predetermined fuel level, and automatically opening the vent on a failure of said source and consequent falling of said level, to assure a continued flow of said predetermined volume from said container.

References Cited in the file of this patent

UNITED STATES PATENTS

| | | |
|---|---|---|
| 1,115,712 | Miller | Nov. 3, 1914 |
| 1,244,667 | Wellington | Oct. 30, 1917 |
| 1,323,113 | Sprangers | Nov. 25, 1919 |
| 1,324,191 | Dillon | Dec. 9, 1919 |
| 1,392,652 | Muzzy | Oct. 4, 1921 |
| 1,406,196 | La Londe | Feb. 14, 1922 |
| 1,481,471 | La Londe | Jan. 22, 1924 |
| 1,745,031 | Scott | Jan. 28, 1930 |
| 1,984,670 | Williams | Dec. 18, 1934 |
| 2,146,729 | Gavin | Feb. 14, 1939 |
| 2,214,008 | Boddy | Sept. 10, 1940 |
| 2,327,373 | Samiran | Aug. 24, 1943 |
| 2,524,274 | Samuels | Oct. 3, 1950 |